United States Patent [19]
Schwartz

[11] 3,753,357
[45] Aug. 21, 1973

[54] METHOD AND APPARATUS FOR THE PRESERVATION OF CELLS AND TISSUES

[75] Inventor: Ralph E. Schwartz, Elgin, Ariz.

[73] Assignee: Ovitron Research Corporation, Avenel, N.J.

[22] Filed: Dec. 14, 1970

[21] Appl. No.: 97,734

Related U.S. Application Data

[63] Continuation-in-part of Ser. No. 757,195, Aug. 8, 1968.

[52] U.S. Cl............... 62/64, 128/1 R, 195/1.8
[51] Int. Cl............................................. A61b 19/00
[58] Field of Search .................. 195/1.7, 1.8; 128/1; 424/101; 99/21, 150; 62/56, 306, 66, 75, 62, 64

[56] References Cited
UNITED STATES PATENTS

| | | | |
|---|---|---|---|
| 3,303,662 | 2/1967 | Moline et al. | 62/62 |
| 2,649,702 | 8/1953 | Kellie | 62/66 |
| 2,662,520 | 12/1953 | McMahon | 128/1 |
| 3,406,531 | 10/1968 | Swenson et al. | 62/309 |
| 3,228,838 | 1/1966 | Rinfret et al. | 62/66 X |

Primary Examiner—William E. Wayner
Attorney—Sandoe, Hopgood and Calimafde

[57] ABSTRACT

The invention contemplates a storage method and apparatus for biological substances by virtue of which solid phase storage is avoided by subjecting the substance to a precompression pressure above atmospheric, and thereafter the specimen is subjected to isovolumetric cooling below 0°C. Where desired, a storage period extension is achieved in solid phase by (a) permitting temperature equilibrium to take place throughout the substance maintained in liquid phase below 0°C as previously described; (b) decompressing the substance sufficiently to permit uniform freezing to take place; and (c) reducing the temperature of the substance to a cryogenic temperature.

14 Claims, 3 Drawing Figures

PATENTED AUG 21 1973 3,753,357

INVENTOR.
RALPH E. SCHWARTZ
BY
Sandoe, Hopgood & Calimafde
ATTORNEYS

METHOD AND APPARATUS FOR THE PRESERVATION OF CELLS AND TISSUES

This application is a continuation-in-part of my co-pending application, Ser. No. 757,195 filed Aug. 8, 1968, and is directed primarily to the extension of the technology taught in that application.

BACKGROUND OF THE INVENTION, GENERAL FIELD

This invention relates to the preservation of biological substances such as vaccines, sera, enzymes, hormones, blood, bacteriological cultures of various forms, tissue, bone, bone marrow, comestibles, and human and animal organs and body portions of all types.

Essentially, this invention relates to the preservation of cells and cell-like structures. The phrase "cell-like" is being used in a generic sense to embrace biological materials which behave similarly under the influence of the inventive technique, as will be further defined.

The basic living unit is the cell. An organ is an aggregate of different cells held in juxtaposition by supporting structures. Each cell type is specially adapted to perform its functional requisites within the system in which it is disposed. The red blood cell, for example, of which there are 75 trillion in the human body, has the primary function of transporting oxygen from the lungs to the tissues. In the human body, an additional 25 trillion cells are made up of various types. Examples of distinctly different body cells making up the 25 trillion are connective tissues, white blood cells, nervous tissue, muscle tissue, and kidney tissue. Animals other than humans (and lower forms of life) are generally analogous, although type and numerical superiority of particular cells over other types differ.

While the cells of the body differ from one another, there are certain basic characteristics which are common. Each cell requires nutrition to maintain its viability, and most utilize the same type of nutrients. Cells derive their energy from oxygen which generally combines with either carbohydrates, fat or protein to release the energy required for the cell to function. General mechanisms for changing nutrients into energy are basically the same, and once the cell has managed the conversion, the end product of the chemical reaction must be transported into the surrounding fluid.

Additionally, most cells (a notable exception is blood cells) have the ability to reproduce by mitosis, and whenever cells of a particular type are destroyed, the remaining cells of that type divide until the appropriate number is replenished. Cells, in other words, are automatons that are capable of living, growing, and providing their own special functions so long as the proper concentrations of oxygen, glucose, the different electrolytes, amino acids and fatty substances are available in their environment.

Generally, cells are composed mainly of five basic substances: water, electrolytes, proteins, lipids, and carbohydrates. The electrolytes are dissolved in the water and provide inorganic chemicals for cellular reactions. They also allow transmission of electrochemical impulses in nerve and muscle fibers and determine the activity of different enzymatically catalyzed reactions necessary for metabolism. Proteins are both structural and enzyme. The structural proteins hold the structures of the cell together, and are generally fibrila. Enzymes are protein in generally globular form; they come into direct contact with other substances inside the cell and catalyze chemical reactions. Lipids make up from 2 percent to 3 percent of the cell, and are in high concentration in the membrane. The lipids are insoluble, and only partially soluble in water, and combine with structural proteins to form the membranes which function to separate the different water compartments of the cell from each other. Carbohydrates have very little structural function in the cell, but play a major role in nutrition of the cell.

Physically, a cell is not a bag containing the foregoing constituents, but is an organized structure lined by membranes actually 75 to 100 angstroms thick, which are elastic. If the cell is to live and grow, it must obtain nutrients and other substances from surrounding fluids.

Substances can pass through a cell membrane three ways: (1) by diffusion through the pores in the membrane or through the membrane matrix of cells; (2) by active transport through the membrane, a mechanism in which enzyme systems in a special carrier substance carries matter through the membrane; and (3) by pinocytosis, a mechanism by which the membrane actually engulfs some of the extracellular fluid and its contents.

Table I illustrates the composition of extracellular fluid compared with that of intracellular fluid. It is particularly important that extracellular fluid contains large quantities of sodium, but only small quantities of potassium. The exact opposite of intracellular fluid. The same dichotomy is true of chlorides and phosphates which are extremely important to the life of the cell.

Of the three methods just mentioned, substances are transported through the cell membranes by two major processes: diffusion and active transport. Diffusion is a complex phenomenon depending upon a great number of factors including the concentration gradient, the solubility of the diffused substance in the lipid of the cell, the membrane pore size vis-a-vis the size of the diffusing molecules, the electrical charge on the diffusing ion and its affinity for non-charged molecules, the existence or non-existence of an electrical gradient across the membrane, and osmotic pressure. (At this juncture, it is interesting to note that the total pressure acting on each side of the membrane in, for example, the human body, at body temperature is 1 million millimeters of mercury.) The amount of osmotic pressure exerted by a solute is porportional to the concentration of the solute in numbers of molecules or ions.

Active transport is a mechanism which accounts for the movement of matter against the concentration gradient or, in other words, uphill. The basic mechanism is believed

Table I

Chemical Compositions of Extracellular and Intracellular Fluids

| | EXTRACELLULAR FLUID | INTRACELLULAR FLUID |
|---|---|---|
| $Na^+$ | 142 mEq/l. | 10 mEq/l. |
| $K^+$ | 5 mEg/l. | 141 mEq/l. |
| $Ca^{++}$ | 5 mEq/l. | <1 mEq/l. |
| $Mg^{++}$ | 3 mEq/l. | 58 mEq/l. |
| $Cl^-$ | 103 mEq/l. | 4 mEq/l. |
| $HCO_3^-$ | 28 mEq/l. | 10 mEq/l. |
| Phosphates | 4 mEq/l. | 75 mEq/l. |
| $SO_4^{--}$ | 1 mEq/l. | 2 mEq/l. |
| Glucose | 90 mgm.% | 0 to 20 mgm.% |
| Amino acids | 30 mgm.% | 200 mgm.% |
| Cholesterol | 0.5 gm.% | 2 to 95 gm.% |
| Phospholipids | 0.5 gm.% | 2 to 95 gm.% |

| | | |
|---|---|---|
| Neutral fat | 0.5 gm.% | 2 to 95 gm.% |
| $PO_2$ | 35 mm.Hg. | 20 mm.Hg? |
| $PcO_2$ | 46 mm.Hg | 50 mm.Hg? |
| pH | 7.4 | 7.0 | to be dependent upon the transport by carriers of which little is known. It is believed that the carrier substance is usually either a phospholipid or a protein. Depending upon the particular posture of the cell within its environment, active transport accounts for such matter as sodium, potassium and other electrolytes, sugars, amino acids, and so on.

The foregoing, which although lengthy, is really a simplification of basic cell processes. It is set forth to provide an environment for a discussion of current techniques which, while physically simple, must account for these great varieties of characteristics if cell viability is to be maintained. Moreover, the foregoing will also make readily apparent to the reader that preservation techniques applicable to cell structures are equally applicable to cell-like structures which I define herein generally as structures made up largely of water and which therefore have characteristics sufficiently analogous that they react favorably to the temperature-pressure process taught herein, and may be stored by such a process. Comestibles are generally cell structures and, while no longer viable (although they may be), they react identically to live cells insofar as the attributes to be retained by the storage technique (taste and consistancy).

BACKGROUND OF THE INVENTION, CONVENTIONAL TECHNIQUES

Historically, the preservation of living cellular materials has turned to the ultra-cold for methodology in a sub-science called cryobiology. Interest in the ultra-cold springs from the fact that cells may be placed in a state of suspended animation in which aging and death do not occur and the metabolic processes can be considerably reduced.

The most outstanding stimulus to generating this interest was a demonstration in 1949 in which the addition of glycerol to the suspending medium permitted the survival of sperm after freezing in temperatures of −79°C. In 1956, Smith showed that in the presence of 30 percent to 50 percent glycerol, red cells can be cooled to −79°C and thawed with minimum hemolysis. Subsequently, work in cryobiology began in earnest.

The route was not easy. Before glycerol, it had been found that while cold slows metabolism, it does not of itself kill. Cellular structure death is caused by a combination of factors which may include: first, mechanical injury by ice crystals; second, chemical injury from increased concentration of salts; third, dehydration; and, fourth, by other factors not at all understood, such as the metabolic imbalance resulting from storage at temperatures where some enzymes continue to function. During slow freezing, ice crystals of pure water grow extracellularly and grow in size as water is extracted from the cell. Solutes are concentrated within the cell as water crystallizes, creating osmotic changes which significantly affect intracellular components, PH changes, precipitation of buffering salts, and denaturation of protein, playing havoc with the balance previously described. Since the velocity of these changes is temperature dependent, freeze/thaw damage occurs primarily during the freezing and thawing processes at temperatures between 0°C and −50°C.

Solutes such as glycerol lower the freezing point, facilitate the movement of water out of the cell, and increase the bound water in the cell, thereby limiting the degree of electrolyte concentration and dehydration. One mol of glycerol will prevent approximately three mols of water from freezing. The rate of freezing must be slow enough to permit diffusion of glycerol through cell membranes to maintain osmotic equilibrium. Consequently, slow rates of cooling in the range of 1°C per minute have been found to be best for glycerolized cells.

One of the more recent trends in cell freezing is to use dimethyl sulfoxide instead of glycerol since it diffuses more rapidly through cell membranes, and when used in the same concentration as glycerol gives superior results in slow freezing.

It is generally agreed among all authors and investigators in the field that the methods tend to be empiric. Further, the understanding of the basic physics and chemistry is fragmentary. The −79°C for example was not a magic number but happened to be the convenient melting point of easily obtainable solid carbon dioxide. With the utilization of commercial liquid nitrogen, a storage temperature of −196°C may be realized.

Even when immediate denaturation is prevented by reducing dehydration with glycerine, there is still a slow decay in viability. Although the exact reason is not known, it is assumed to be the result of glycerine itself which, because of its properties as a strong hydrogen bonder, may denature protein directly. This effect can be retarded by lowering the temperature, and becomes negligible at temperatures of −80°C or below.

The foregoing methodology for slow freezing, while it has advanced storage techniques, requires the punctilio of care substantially beyond the capability of the ordinary technician. Further, the presence of glycerol or dimethyl sulfoxide must be carefully tracked, and must be added and removed at appropriate stages in the process. Moreover, neither of these two additives present the universal panacea for all cell structures, and experimentation is still taking place to determine the limits of their use.

Rapid freezing, on the other hand, has three requirements for successful preservation: (1) the freezing must be extremely rapid; (2) the storage must be at an extremely low temperature; and (3) the thawing must be extremely rapid. Most failures in past efforts are attributed to either the insufficient recognition of one of these requirements, or the inability to obtain them. The specimen must not only be plunged into a liquid gas environment (such as liquid air), but the specimen must be of such geometrical form so that uniform rapid freezing throughout takes place. Most techniques center about the use of a very small sphere formed by spraying the specimen from a rapidly oscillating jet.

In blood, the attainment of a favorable surface-to-volume ratio requires the upper size limit of the whole blood to be of a sphere of 1 millimeter in diameter. Storage is only successful if at a temperature below that at which ice crystals can grow to lethal size or denaturation can proceed at any appreciable rate.

In summary, slow freezing is probably the more practical technique. Crystals are allowed to grow extracellularly, and dehydration denaturation is prevented with an additive, usually glycerine or dimethyl sulfoxide. The technique, however, is restricted to those specimens in which high glycerine or dimethyl sulfoxide concentrations are tolerated. The subsequent removal of the glycerine by dialysis is a time consuming and exacting procedure but necessary.

Rapid freezing, on the other hand, has the major disadvantage of requiring a division of the specimen into particles of extremely small size in order to achieve rapid heat exchange.

A more detailed analysis of the foregoing techniques may be made by review of the periodical "Cryobiology" begining with the year 1963.

SUMMARY OF THE INVENTION

A review of the more significant papers on cryobiology leads one to the inevitable conclusion that experimenters in the field have routinely followed the footsteps of their predecessors in attempting to obviate the brick wall which each has ultimately faced when attempting to move the state of the slow and rapid freezing art forward. None, however, has gone back to the beginning and questioned the initial freezing itself.

Briefly, my invention is predicated upon the careful control of temperature and pressure in such a manner that the characteristics of the substance sought to be preserved are maintained. In the first embodiment, this is accomplished by the avoidance of freezing shocks as well as the avoidance of the phenomenon of freezing itself. In the second embodiment, which is an extension of the first embodiment, freezing takes place but without the phenomenon of the moving front through the substance and its accompanying shock. The foregoing permits the maintenance of the cell integrity as well as its chemistry while lowering its metabolic rate sufficiently to obviate deterioration.

More particularly, the biological substance to be preserved is surrounded with an isotonically inert and compatible medium which is itself embraced in a non-dilatable vessel (in blood, the red cell is already embraced by such a medium). This combination is them precompressed at a temperature above freezing. Preferably, this precompression takes place at a temperature approximately that of the maximum density point. Inasmuch as the nondilatable vessel is isovolumetric, any lowering of the temperature will be accompanied by an increased pressure. By careful control of temperature and pressure, it may be seen that the self-generated (due to temperature decrease) plus precompression pressure will be sufficient within certain temperature limits to maintain the medium plus biological substance in a non-frozen state notwithstanding a temperature below 0°C.

While the foregoing significantly enhances the useful storage life of such substances by decreasing the metabolic rate, it has been found that the invention can be significantly extended by moving into the frozen phase.

Succinctly stated, it has been found that where the medium and biological substance has been brought to, for example −10°C, in the manner previously described and maintained at this temperature for a period sufficient to allow the heat to transfer entirely from the cell and medium to the container, then removal of a predetermined amount of pressure will shift the equilibrium from the liquid phase to the solid phase and freezing will take place simultaneously throughout the cell and medium.

The above mentioned and other features and objects of this invention and the manner of attaining them will become more apparent and the invention itself will best be understood by reference to the following description of embodiments of the invention taken in conjunction with the accompanying drawings, the description of which follows.

FIG. 1 graphically illustrates permissible precompression vs. final storage temperature parameters in p.s.i. and degrees centigrade for effectuating liquid phase storage below 0°C;

FIG. 2 is a sectional illustration of a storage vessel and its organ contents according to the invention; and FIG. 3 is a schematic illustration of the control apparatus for storage in liquid and solid phases.

DETAILED DESCRIPTION OF THE INVENTION

Figure 2:
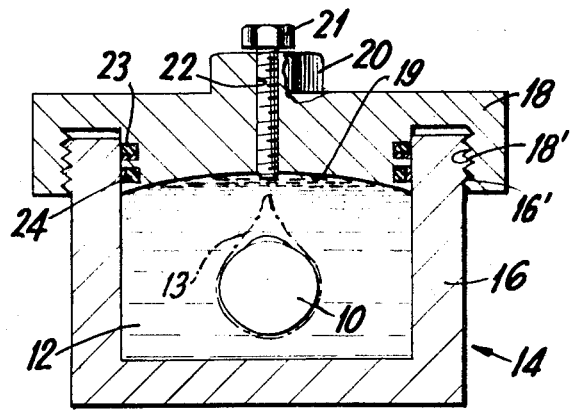

As previously discussed, conventional storage techniques involving storage in a solid phase often cause cellular structure death or non-viability by a combination of factors which generally stem from the ice formation. While it has been generally appreciated that cells are largely water, very little investigation has been undertaken with respect to the full water analogy. Stated differently, the amount of water in the cell and cell-like structures indicates that their static, dynamic and physical characteristics are such that their behavior may be anticipated by the water analogy in several important respects. For example, both water and cell structures achieve maximum density between 3° and 4°C. Accordingly, both above and below 3° − 4°C, cells will attempt to expand.

Almost analogous is the phenomenon of freezing. Because of an almost unavoidable temperature gradient between the center of the cell mass and the outer cells, freezing necessarily takes place in laminar stages or shells, moving as a front from the outside to the inside as the latent heat is expended. This also accounts for a pressure shudder which is transmitted throughout the intra- and extracellular fluids. While it is generally agreed that cell membranes are permeable and ductile, sudden changes do not permit the maintenance of equilibrium between intra- and extracellular fluids, osmotic equilibrium, and so on, as previously discussed. It is this precise effect which has required the use of glycerol and dimethyl sulfoxide in slow feeezing techniques and the maximizing of surface area/volume in fast freezing techniques.

As described in my previous patent application, Ser. No. 757,195, the free expansion of water and, analogously, of cell fluids where freezing, for example, takes place at one atmosphere (about 0°C) is 9 percent; but, the compressibility of water and cell fluids at this temperature and pressure, due to the change in state, is only 4.2 percent. Thus, when rapid expansion takes place in a controlled volume, ice would form to a total amount of expansion to cause a change of 4.2 percent of the volume; beyond this point no more ice could form at that temperature.

Hence, the ability of water or cellular fluids to convert to a solid state depends upon their compressibility. I have discovered that, if this compressibility can in some manner be accounted for, crystallization or freezing of a portion can be avoided. Specifically, I have found that a sufficient amount of precompression may be applied to the cells or cell-like structures to take up the available compressibility, thereby eliminating or controlling surges of pressure and eliminating freezing.

As will be appreciated by those skilled in the art, the freezing point of a liquid depends upon the prevailing temperature and pressure. Thus, at pressure $P_1$, the freezing point would be $T_1$, but at $P_2$ (where $P_2 > P_1$) the freezing temperature would be at $T_2$, a lower temperature than $T_1$.

Precompression may be defined for the purposes of this disclosure and invention as the mechanical application of positive pressure at any temperature above the freezing point of the substance being worked upon.

Precompression may be applied in a unitary manner at one temperature, or it may be applied in stages with the introduction of a defined pressure increased at predetermined temperature points (for example, 5,200 p.s.i. at 4°C, 3,000 p.s.i. at −5°C, 2,000 p.s.i. at −10°C, and so on; p.s.i. absolute is to be inferred in all pressure values).

As mentioned, precompression may be applied at any temperature above freezing; however, in order to define its magnitude, the value of the precompression pressure will be measured at the maximum density. Depending upon the cell or cell-like structure, this is anywhere from 2° to 6°C.

For example, assume that in a non-yielding vessel, 4,000 p.s.i. pressure is applied at a temperature of 5°C. Assuming the particular cell structure will thereafter contract as the temperature is decreased to 4°C, the actual magnitude of "precompression pressure" will be 4,000 p.s.i. minus the pressure drop due to the volumetric contraction to the maximum density. The same contraction principle would apply if pressure were introduced at 2°C and a precompression pressure would be 4,000 p.s.i. minus the pressure drop due to contraction if, theoretically, the temperature were raised to the maximum density point.

While it is relatively easy to visualize blood for example being placed in containers and pressurized, it may be difficult for the reader to visualize the same effect taking place with cell structures as varied as cornea, kidneys, tissues, bone marrow, bone, brain cells, enzymes, sera, comestibles, etc. However, in these cases, the specimen which it is desired to store is first immersed in an isotonically inert and cell-compatible medium. The functional requisites of such a medium are: that it will not cause chemical leaching; it has a freezing point approximately the same as the biological substance immersed therein; is sterile; and provides no detrimental effects within the temperature and pressure range envisaged, i.e. is both chemically and physically compatible. Examples of solutions which meet the foregoing functional requisites are Buckley's solution, macrodex, Collins solution, plasma, whole blood, and saline solution.

Precisely which solution is most compatible with the cell structure under consideration must be empirically determined for that cell structure; however, I have found that Buckley's solution which has a variable PH and electrolyte pattern similar to plasma is the most universal of the foregoing, and tends to work well with most human cells.

The invention contemplates the use of self-generating pressures after or between the mechanical precompression stages. This is accomplished by isovolumetric temperature changes. That is, where a watery substance is contained within a non-dilatable or non-yielding vessel (i.e. a vessel having a sufficiently high modulus of elasticity and yield point so as to reduce to almost a negligible amount the radial displacement of the vessel when the temperature is lowered below 4°C) and the temperature lowered from the maximum density point, a pressure is generated (referred to as "self-generating") due to the attempt of the liquid to expand. The result is that the point of rapid expansion at which ice is formed (normally at approximately 0°C at one atmosphere of pressure) will be lowered until the forces acting upon the fluid and its tendency to reach the solid stage overcome the pressure inhibition.

Referring now to FIG. 2, a cellular structure, for example, a cornea 10 is immersed in Buckley's solution 12 within a non-dilatable vessel 14 composed of a cup-shaped member 16 threaded at its upper part 16', and a cover member 18 having mating threads 18'. Preferably, a close inside tolerance is afforded where a concave mesa portion 19 depends into the cup member 16. Nuthead 20 is welded to the cover 18 concentrically to provide a convenient place where leverage can be applied in turning the cover relative to the cup. Aperture 21 is disposed centrally of the cover and may be sealed by a threaded plug 22. This aperture in conjunction with the concave formation 19' of the mesa permits the exit of trapped gases and air during initial travel of the cover towards the cup. Sealing rings 23 and 24 are provided as described in the referred to copending application to effect a hermetic seal which is nonwetting and easily autoclaved.

The foregoing arrangement provides for direct immersion of the organ in the vessel. However, it may prove more economical to utilize a plastic bag 13 shown in phantom in FIG. 2. Where the bag is employed, the fluid between the outside of the bag and the inside of the container is critical only in its temperature characteristics, and sterility problems are substantially reduced. In such a case, the organ would be preferably wrapped in sterile gauze which has been saturated in Buckley's or Collins solution (to protect the surface of the organ), a minimum amount of additional solution being introduced into the bag to permit uniform pressure application. The bag is then sealed and evacuated. Where the bag technique is utilized, a satisfactory immersing solution 12 may be formed of distilled water treated with 5 percent ioclide, or may be the same inert compatible liquid immediately surrounding the organ.

The vessel 14 should be formed of material sufficiently strong to withstand internal pressures of the order of 20,000 to 40,000 p.s.i. and should have stress-strain relationships sufficiently high so that during the pressure range of use negligible dilation or radial displacement will occur. The thermal coefficient of expansion on the other hand must be such that its effect over the intended temperature range will either increase pressure or will be compensated by elastic deformation due to dilation. Desirably, the vessel should also be easily adaptable to autoclaving/type sterilization and have its internal surfaces nonwetting with the fluids to be used therein.

One practical vessel material is nickel, and the vessel may be formed by electroforming it upon a cylindrically shaped mandril which may be coated with silver or another suitable electrode material and polished to a micro-finish. The method of effecting such a vessel is well known to those skilled in the art, and for greater detail reference may be had to the patent application referred to above.

Figure 1:
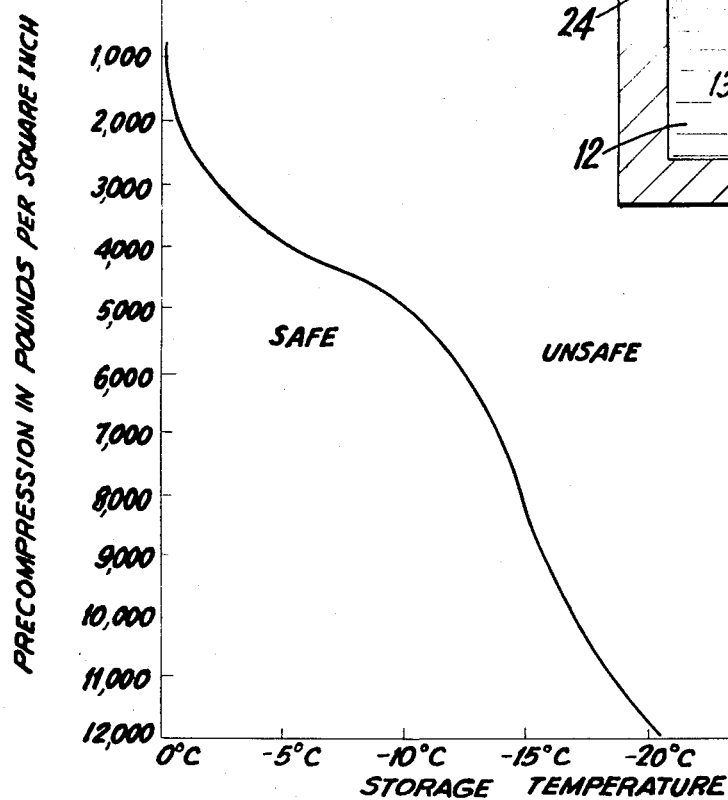

Typically, the freshly received cornea 10 immersed in Buckley's solution 12 would be brought to a uniform temperature of approximately 3.9°C (the maximum density point). Cover 18 would then be angularly displaced until solution 12 exits from aperture 22. At this time, the hermetic plug 21 would be turned into place. Leverage is now applied to nut 20, forcing the mesa section of the cover into the fluid and thereby applying pressure within the vessel. The amount of pressure to be applied depends upon the storage temperature envisaged. FIG. 1 is a graph of the precompression in pounds per square inch necessary for the storage temperatures set forth on the horizontal axis. Assuming a storage temperature of −101°C, a precompression pressure of 5,000 pounds has been found sufficient.

While the pitch of the thread between the cup member and the cover is optional, it should be understood that the thread depth must be sufficient to withstand the anticipated internal pressures. A pitch of approximately 11 threads per inch has been found suitable for use with a torque wrench having a lever arm of 18 inches. For the embodiment under consideration, the vessel shown in FIG. 2 would have an approximate volume of one pint.

If desired, a pressure gauge may be attached to the outside of the vessel. However, in use it has been found that tolerances may be closely enough kept during manufacture, such that a vernier marking on the outside of the vessel will establish the internal pressure.

Figure 3:
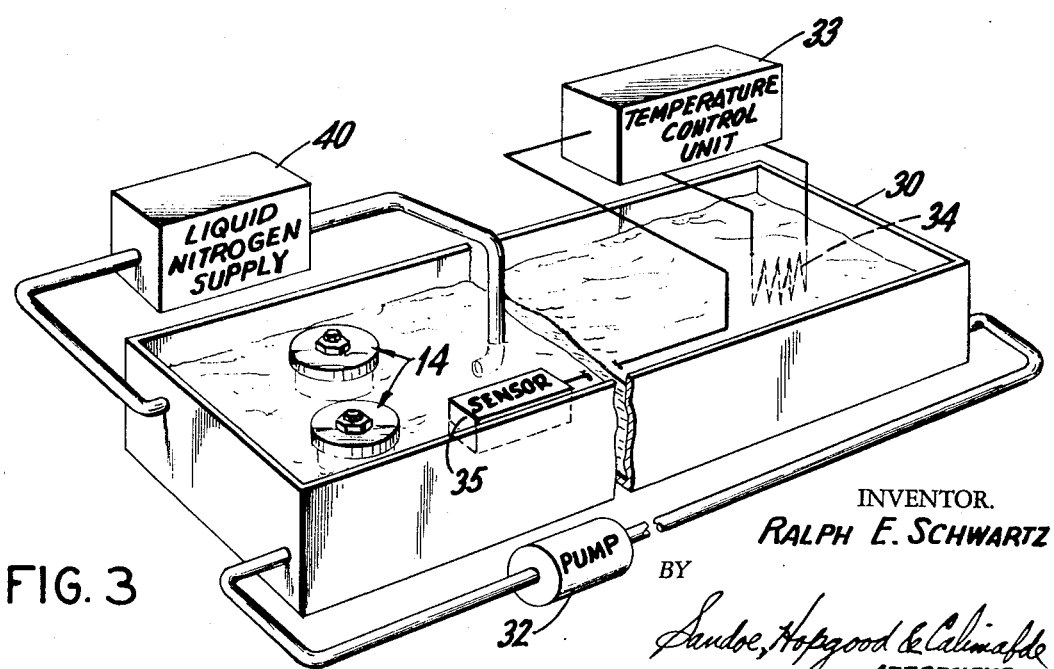

FIG. 3 illustrates one exemplary mode of achieving the proper temperatures. Preferably, the container of FIG. 2 is placed within the environment of a temperature controlled bath within which a fluid 30 such as conventional antifreeze is circulated by means of a pump 32. The temperature of the bath is controlled in the conventional manner by means of the refrigerating unit 33, the schematically shown cooling coils 34 being disposed to remove heat from the circulating antifreeze. A temperature sensor 35 is disposed within the bath to adequately control its temperature.

In the foregoing example, the temperature of the vessel is first brought as quickly as possible to 3.9°C by its introduction into the constant temperature bath. When sufficient time has passed for the vessel and its contents to assume a uniform temperture, the piston which comprises the mesa or underside of the vessel cover is surfaced on the contained fluid. At this point, sealing member 21 is threaded into the opening as described, and the precompression pressure is applied. The precompression pressure is applied in a controlled manner, preferably at 1,000 p.s.i. or less per minute with the pressure being increased as linearly as possible to avoid pressure transients throughout the fluid. This may be accomplished by a substantially constant angular velocity being imparted to the vessel cover. It has been found that this may be satisfactorily accomplished within the suitable limits manually by a torque wrench. Once the desired precompression has been achieved, the vessel is brought to −10°C, also in a controlled bath environment. This may also be the bath of FIG. 3 which may be variable or may, alternatively, be in a separate bath. The temperature change is again brought about as quickly as possible. When the cornea is required for use, the procedure is reversed and the temperature is brought up to 3.9°C where the precompression is removed, again at a rate preferably around 1,000 p.s.i. per minute to avoid disadvantageous pressure transients.

When the temperature has dropped to the storage temperature of −10°C, a pressure will be self-generated within the vessel. Since this pressure exceeds that which would permit freezing, storage may take place at this temperature for a time which is limited only by the metabolic decay rate of the cell. While not completely understood, I have found that the metabolic decay rate depends not only upon the storage temperature, but the pressure as well.

Further, while precompression up to 12,000 pounds will assure that freezing will not take place in most cells until −22°C, tests have shown that if storage is to take place between −15° and −20°C, the amount of precompression which will be necessary in one stage can produce undesirable cell damage in some instances. This can be avoided by applying the pressure gradually or in stages. In such a case, for example, if it were desired to achieve −15°C as the storage temperature, in the above example an additional 3,000 p.s.i. precompression could be mechanically applied at −10°C.

It should be appreciated by those skilled in the art that the line in FIG. 1 is only a coarse determination of safe and unsafe conditions. For tissue graphs, for example, some cell destruction is acceptable. Consequently, the line may be much more nearly approached than in, for example, the storage of a kidney where minimum cell damage can be tolerated. In the latter case, storage conditions should be such that the parameters produce conditions well to the left of the line.

Table II indicates satisfactory temperature and pressure ranges for various materials stored in accordance with the invention, as well as denoting the materials and fluids within which they are immersed.

In all the foregoing, it has been assumed that storage is to take place in liquid phase in contradistinction to the state of the art described in the preamble to this specification. I have found that the invention may also be advantageously employed to achieve solid state storage at cryogenic temperatures with none of the deleterious effects presently Table II
Liquid Phase Storage

| Substance | Liquid* Environment | Recompression Pressure PSI | Storage Temp. °C | Storage Pressure PSI |
|---|---|---|---|---|
| Skin Tissue | Macrodex 6% | 10,000 | −15° | 22,050 |
| Cornea | Buckley's Sol. | 4,000 | −5° | 7,350 |
| Bone | Plasma** | 10,000 | −7° | 10,290 |
| Bone Marrow | Plasma*** | 10,000 | −7° | 10,290 |
| Kidney | Collins Sol. | 8,000 | −8° | 13,200 |
| Heart | Collins Sol. | 8,000 | −8° | 13,200 |
| Whole Blood | Plasma** | 5,000 | −10° | 15,000 |
| Platelets | Plasma** | 4,000 | −4° | 6,000 |
| White Cells | Plasma** | 6,000 | −9° | 13,500 |

* Organs, such as kidneys for example, which are prone to edema, are preferably wrapped in sterile gauze which has been saturated in Collins solution, placed in a plastic bag, sealed and evacuated and placed in the vessel which is filled with distilled water treated with 5 percent ioclide.
** This could be its own plasma, centrifuged, chilled to 4 °C and filtered to remove fibrin and lipids.
*** No additional plasma required encountered in freezing cellular structures and the like. "Cryogenic temperature" shall be defined herein as temperatures between that of solid carbon dioxide (−70°C) and the lowest obtainable liquid (presently liquid helium, −269°C).

In order to obtain the benefit of a storage at such low temperatures where the metabolic rate is negligible, I have found that the inventive technique may be utilized by taking advantage of the already subfreezing temperature previously obtained as described above. "Subfreezing" for the purpose of this description shall be defined herein as a temperature at which, at normal pressure, there would be freezing. It will be recalled that I have described the use of precompression and self-generated pressures to achieve liquid phase storage. It will now be apparent that the release of a portion of this pressure will permit freezing to take place. That is, if the substance being stored as well as the medium in which it is immersed is permitted to achieve a uniform temperature throughout (i.e. the vessel remains in the liquid bath a sufficient length of time so that the temperature in the center of the substance is similar to that at the periphery), then the removal of an amount of pressure which is just sufficient to maintain liquid phase will produce a uniform freezing throughout the entire substance. In the example previously described, the cornea is maintained at − 10°C for sufficient time (this time element is a function of mass and heat transport characteristics) to permit a uniform temperature to develop. It is then uniformly converted into the solid phase by simply removing approximately 500 p.s.i. This amount of pressure drop is variable, dependent upon the characteristics of the tissue involved and the value of the latent heat of freezing of a given mass. Storage may then take place at cryogenic temperatures at or below the new pressure.

It will be appreciated by those skilled in the art that the achievement of simultaneous uniform freezing has been accomplished by the inventive technique without the necessity of generating minute globules, heretofore demanded by rapid freezing techniques, and it has also been achieved without the deleterious effects of a freezing front advancing isothermally throughout the substance.

While "snap-freezing" by pressure removal at below 0°C temperatures has been known heretofore, it has never been successfully applied to viable cells. This lack of success is directly attributable to the manner of pressure application to achieve sub-zero temperatures in liquid phase as well as the amount of pressure reduction and the gas pressure environment.

While little time has been spent in this disclosure in outlining the freezing technique, this is not to be taken as any minimization of its importance. Rather, it merely emphasizes its universal simplicity. Once the temperature and pressure controls have been imparted, as described, at a rate such that sub-freezing temperatures are accomplished with viable cells within a liquid environment, then a freezing environment may be achieved by removal of pressure. Pressure removal may be accomplished by rotation of the cover opposite to that direction which imparted pressure, or, alternatively, once all of the desired temperature and pressure parameters have been fixed for the substance and its embracing fluid, pressure removal (decompression) may be effected by either a camming arrangement which permits a piston to ride up a chamber (internally of the cover)

a specific amount to give the precise decompression desired, or by utilizing the exit aperture 21. In the latter case, the aperture must be of a size so that a predetermined number of turns on the sealing plug 22 permits the pressure to be released the desired amount without interfering with the structural integrity of the cover.

Once solid phase storage has been accomplished in the foregoing described manner, the refrigeration liquid may be removed from the bath and liquid nitrogen introduced by any conventional means as shown in FIG. 3. Alternatively, a separate nitrogen bath may be employed.

Table III indicates satisfactory first stage temperature and pressure parameters, and decompression Table III Solid Phase Storage

| Substance | Liquid* Environment | Initial Pressure PSI | Initial Temp. °C | Decompression Pressure PCI | Final Storage Temp. °C |
|---|---|---|---|---|---|
| Skin Tissue | Macrodex 6% | 22,050 | −15° | 20,950 | −196° |
| Cornea | Buckley's Sol. | 7,350 | − 5° | 6,800 | −196° |
| Bone | Plasma** | 10,290 | − 7° | 9,500 | −196° |
| Bone Marrow | Plasma*** | 10,290 | − 7° | 9,500 | −196° |
| Kidney | Collins Sol. | 13,200 | − 8° | 12,700 | −196° |
| Heart | Collins Sol. | 13,200 | − 8° | 12,700 | −196° |
| Whole Blood | Plasma** | 15,000 | −10° | 14,200 | − 196° |
| Platelets | Plasma** | 6,000 | − 4° | 5,500 | −196° |
| White Cells | Plasma** | 13,500 | − 9° | 12,800 | −196° |

\* Organs, such as kidneys for example, which are prone to edema are preferably wrapped in sterile gauze which has been satured in Collins solution, placed in a plastic bag sealed and evacuated and placed in the vessel which is filled with distilled water treated with 5 percent ioclide.
\*\* This could be its own plasma, centrifuged, chilled to 4°C and filtered to remove fibrin and lipids.
\*\*\* No additional plasma required ranges for various materials stored in accordance with this embodiment of the invention as well as denoting the mediums in which they are immersed.

While the principles of the invention have been described in connection with specific apparatus, it is to be clearly understood that this description is made only by way of example and not as a limitation to the scope of the invention.

What is claimed is:

1. A method of storing living cell and cell-like biological substances without destroying their cellular integrity comprising the steps of:
   precompressing said biological substances to a pressure effectively above atmospheric in a series of successive stages and simultaneously reducing the temperature while maintaining the volume substantially constant, the temperature being maintained at all times above that at which freezing would take place, the precompression being applied at a rate sufficiently low to avoid damaging pressure transients, and
   storing said biological substances at a reduced temperature.

2. A method of storing living cell and cell-like biological substances without destroying their cellular integrity comprising the steps of:

wrapping said biological substances in a sterile gauze saturated in an isotonically inert and compatible medium;

precompressing said biological substances to a pressure effectively above atmospheric at a rate sufficiently low to avoid damaging pressure transients and at a temperature above the freezing point thereof, said precompression pressure being dependent upon a predetermined lower temperature to be attained during the method;

reducing the temperature of said biological substances to said lower temperature while maintaining its volume substantially constant, said lower temperature being above that which would permit freezing of said biological substances at the thereby generated pressure and at or below the normal freezing temperature of said biological substances at atmospheric pressure; and storing said biological substances at a reduced temperature.

3. A method of storing living cell and cell-like biological substances without destroying their cellular integrity comprising the steps of:

precompressing said biological substance to a pressure above 1,000P.S.I at a rate sufficiently low to avoid damaging pressure transients and at a temperature above the freezing point thereof, said precompression pressure being dependent upon a predetermined lower temperature to be attained during the method;

reducing the temperature of said biological substance to said lower temperature while maintaining its volume substantially constant, said lower temperature being above that which would permit freezing of said biological substance at the thereby generated pressure and at or below the normal freezing temperature of said biological substance at atmospheric pressure; and storing said biological substance at a reduced temperature.

4. The method of storing biological substances as claimed in claim 1, wherein said method comprises the further step before precompression of immersing said biological substance directly in a pressure transmitting liquid medium, said precompression pressure being applied to said substance through said medium.

5. The method of storing biological substances as claimed in claim 1, wherein the pressure and storing temperature are determined in accordance with the curve of FIG. 1 and the area to the left thereof.

6. The method of storing biological substances as claimed in claim 1, comprising the further steps of:

storing said biological substance at said lower temperature for a time sufficient to permit it to achieve temperature equilibrium;

decompressing said biological substance and medium at said lower temperature by an amount just sufficient to permit uniform freezing of said biological substance.

7. The method of storing biological substances as claimed in claim 6, comprising the further steps following said freezing step, of lowering the temperature of said biological substance to a cryogenic temperature, and storing said biological substance thereat.

8. The method of storing biological substances as claimed in claim 1, comprising the further steps of:

storing said biological substance and medium at said lower temperature for a time sufficient to permit them to achieve temperature equilibrium; and decompressing said biological substance and medium at said lower temperature by an amount just sufficient to permit complete freezing of said biological substance and medium.

9. The method of storing biological substances as claimed in claim 8, comprising the further steps, following said freezing step, of lowering the temperature of said biological substance and medium to cryogenic temperatures, and storing said biological substance and medium thereat.

10. The method of storing biological substances as claimed in claim 4, wherein said pressure transmitting liquid is an isotonically inert and compatible medium.

11. The method of storing biological substances as claimed in claim 4, wherein said immersing step comprises the initial steps of confining said biological substance and an isotonically inert and compatible medium in a plastic bag, and thereafter immersing said bag in said pressure transmitting liquid medium.

12. A method of storing living cell and cell-like biological substances without destroying their cellular integrity comprising the steps of:

immersing said biological substance into a vessel containing a pressure transmitting liquid medium, said vessel having the ability to withstand the internal pressures to be generated and temperature variations to be effected during the method with substantially no change in volume;

precompressing said medium and immersed substance in said vessel to a pressure above 1,000P.S.I. at a rate sufficiently low to avoid damaging pressure transients and at a temperature above the freezing point thereof;

reducing the temperature of said vessel and the contents thereof to a temperature of less than 0°C and more than −22°C; and storing said biological substance while immersed in said medium at a reduced temperature.

13. The method of storing biological substances as claimed in claim 12, wherein said pressure transmitting liquid is an isotonically inert and compatible medium.

14. The method of storing biological substances as claimed in claim 12, wherein said immersing step comprises the initial steps of confining said biological substance and an isotonically inert and compatible medium in a plastic bag, and thereafter immersing said bag in said pressure transmitting liquid medium.

* * * * *